United States Patent [19]

Kamei

[11] 4,295,972
[45] * Oct. 20, 1981

[54] METHOD FOR TREATING WATER CONTAINING WASTES

[75] Inventor: Takeji Kamei, Fuji, Japan

[73] Assignee: Nihon Automatic Machinery Mfg. Co., Ltd., Japan

[*] Notice: The portion of the term of this patent subsequent to Oct. 7, 1997, has been disclaimed.

[21] Appl. No.: 147,381

[22] Filed: May 7, 1980

Related U.S. Application Data

[62] Division of Ser. No. 35,201, Apr. 30, 1979, Pat. No. 4,226,712.

[30] Foreign Application Priority Data

Apr. 28, 1978 [JP] Japan ................................. 53-51916
Apr. 29, 1978 [JP] Japan ................................. 53-51195

[51] Int. Cl.³ ............................................. C02F 11/14
[52] U.S. Cl. ................................... 210/710; 210/750; 210/770; 71/11
[58] Field of Search .................. 210/10, 18, 42 R, 45, 210/49, 65, 66–68, 71, 56, 218, 180, 179; 71/12, 13, 11

[56] References Cited

U.S. PATENT DOCUMENTS

| 3,342,731 | 9/1967 | Baumann et al. | 210/10 |
| 3,345,288 | 10/1967 | Sontheimer | 210/10 |
| 3,442,498 | 5/1969 | Davis | 210/10 |
| 3,623,975 | 11/1971 | Cardinal, Jr. et al. | 210/67 |
| 3,963,471 | 6/1976 | Hampton | 210/10 |
| 4,125,465 | 11/1978 | Turovsky et al. | 210/10 |
| 4,145,278 | 3/1979 | Davy | 210/10 |
| 4,226,712 | 10/1980 | Kamei | 210/218 |

Primary Examiner—Benoît Castel
Attorney, Agent, or Firm—McGlew and Tuttle

[57] ABSTRACT

A method for treating a water containing waste such as industrial sludges and animal excrements. The method comprises a first step of mixing the waste with an alkaline earth metal oxide such as calcium oxide to obtain a preliminarily dried mixture and a second step of further drying and granulation of the mixture. Fuel consumption is saved by utilization of the exothermic reaction of an alkaline earth metal oxide with water contained in the waste. The waste may be converted by the method to usable products such as fertilizers, cement materials or cement additives.

1 Claim, 2 Drawing Figures

METHOD FOR TREATING WATER CONTAINING WASTES

This is a division of application Ser. No. 035,201 filed Apr. 30, 1979 now U.S. Pat. No. 4,226,712.

BACKGROUND OF THE INVENTION

1. Field of the Invention

This invention relates to a method of treating a water containing waste. Particularly, this invention relates to a method for treating a water containing organic waste such as animal and human excrements, fish processing wastes, sludges comprising dead microorganisms, sludges from paper industry or fruit processing wastes, and a water containing inorganic waste such as sludges from chemical or sewage disposal plants.

2. Description of the Prior Art

There have been various proposals for treating a water containing organic or inorganic waste. It has been proposed to treat excrements of domestic animals by mixing the excrements with calcium oxide thereby attempting to dry the mixture by the exothermic reaction of calcium oxide with water contained in the excrements. However, the mixture thereby obtained still contains a substantial amount of water and gives off an offensive filthy odor until it is cooled. The mixture is not granulated and therefore is not yet suitable for disposal or for use as a fertilizer. As the mixture still has a high countent of water, it cannot be easily processed by an ordinary pelletizer. It is therefore necessary to further remove water, before subjecting the mixture to a granulation step, by subjecting the mixture to a separate drying operation. The emission of the offensive filthy odor creates a troublesome and annoying problem in the handling and transportation of the mixture, and a loss of heat during the transportation of the mixture from the reactor to a dryer adversely affects the economy of the fuel consumption of the drying operation.

On the other hand, inorganic wastes such as sludges from chemical or sewege disposal plants usually comprise very fine particles in a mashy state. Because of their nature, the handling and transportation of such sludges are troublesome and very difficult. It is very difficult to remove water from such sludges either by a filter press or by a dryer. They used to be buried under ground, however, they frequently contain noxious elements such as heavy metal ions or sulfate ion, which create pollution problems. It has been proposed to mix such a sludge with a cement thereby to obtain a concrete product. This method is costly. Besides, the concrete product thereby obtained is brittle and not suitable for use as a construction material. Water soluble noxious substances are still likely to ooze out of the product.

SUMMARY OF THE INVENTION

This invention is intended to overcome the difficulties in connection with the treatment of water containing organic and inorganic wastes and to convert them into usable products. Organic wastes may be converted to fertilizers which are then returned to the earth, and inorganic wastes may be converted to a stabilized unnoxious cement type materials.

While based on the above mentioned utilization of the exothermic reaction of calcium oxide with water, the present invention perfects the technique to a practical level.

The invention provides a method of treating a water containing organic and/or inorganic waste, which comprises a first step of mixing the waste with an alkaline earth metal oxide such as calcium or magnesium oxide to obtain a preliminarily dried mixture and immediately subjecting the mixture, while it is still hot, to a second step of further drying and granulation. It should be understood that according to the present invention, the exothermic reaction of calcium oxide or other alkaline earth metal oxides with water is effectively used in combination with the second step of further drying and granulation.

The granule products obtained from the treatment of an organic waste such as animal or human excrements, fish processing wastes, fruit processing wastes or organic sludges, are useful as fertilizers.

Inorganic wastes such as sludges from chemical plants may be converted by an additional step of heating the product obtained from the second step, at a temperature from about 800° C. to about 1,450° C., into cement type products or cement additives. Noxious substances in the wastes may be converted by the method of the present invention to innoxious substances or otherwise fixed in the final products such that they no longer cause pollution problems.

The present invention also provides an apparatus specially adapted to carry out the method for the treatment, which comprises a reactor for an exothermic reaction of a mixture of the waste and an alkaline earth metal oxide, a drying kiln for granulation adapted to receive the mixture from the reactor and provided with a stirrer means to agitate the mixture for water removal and granulation, a furnace enclosing the drying kiln so as to heat it from outside and adapted to burn a stinking exhaust gas from the reactor and/or the drying kiln into an odorless exhaust gas, and an exhaust collector means adapted to collect a stinking exhaust gas from the reactor and/or the drying kiln and transport it to the furnace. It should be understood that the apparatus is so designed that the exhaust gas from the reactor and drying kiln, which has an offensive filthy odor, is collected by the exhaust collector means and passed over to the furnace, whereby the gas is burned into a virtually odorless exhaust gas thus eliminating the annoying filthy odor problem and air pollution. In a preferred embodiment of the invention, a screw conveyor is adapted to transport the mixture form the reactor to the drying kiln. The screw conveyor is particularly effective for the transportation of the sludge mixture of this type and it provides a further mixing of the mixture during the transportation thereby promoting the exothermic reaction. It should also be noted that the apparatus is so designed that the mixture from the reactor is transferred to the drying kiln while it is still hot thus minimizing a loss of heat during the transportation and saving on fuel consumption in the subsequent drying operation. The drying kiln is preferably a rotary kiln thereby minimizing a possible adherence of the material on the inside wall of the kiln and at the same time effectively facilitating the water removal and granulation of the mixture.

A preferred embodiment of the invention will now be described with reference to the accompanying drawings.

DETAILED DESCRIPTION OF THE INVENTION

Figure 1:
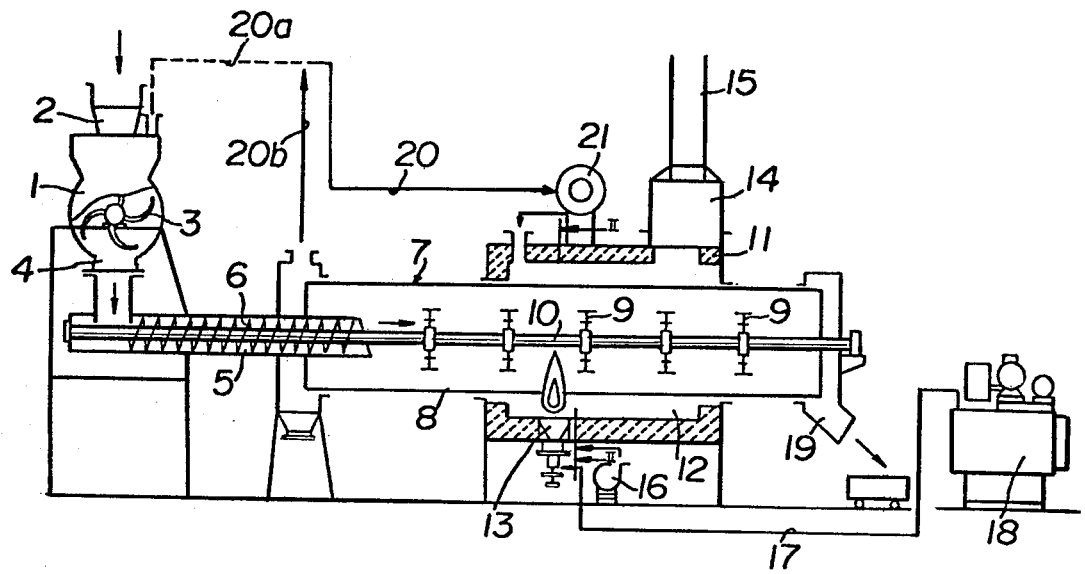
FIG. 1 illustrates an apparatus for carrying out the present invention.
Figure 2:
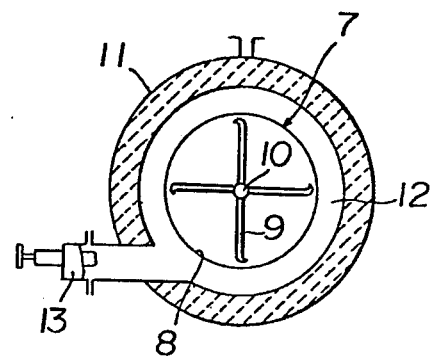
FIG. 2 is a cross sectional view taken along the line II—II of FIG. 1.

Referring to FIG. 1, reference numeral 1 designates a reactor having, at its top, an inlet 2 in a shape of a hopper and, within it, rotational arms 3. Immediately below an outlet 4 of the reactor 1, a first end of a conveyor 5 is disposed. The conveyor is preferably a screw conveyor as illustrated. Reference numeral 6 designates a screw of the screw conveyor. The other end of the conveyor 5 is extended to a drying kiln 7 which is a type suitable for granulation of the mixture. The drying kiln for granulation has a cylindrical body 8 and is provided with a stirrer means having stirring vanes 9. The stirring vanes are attached to a rotational shaft 10. The shaft may be an extension of the shaft of the screw conveyor 5 as illustrated, or it may be separate from the shaft of the screw so that each shaft may have its own rotational speed independently of the other shaft. It is preferred that the drying kiln is a rotary kiln so that the body 8 is rotatable. The drying kiln 7 is enclosed by a furnace 11, and thereby heated from outside. A heating chamber 12 is formed inside the wall of the furnace which is made of a heat insulation material. The furnace 11 is provided with a burner 13 and adapted to burn a stinking exhaust gas from the reactor 1 and/or the drying kiln 7 into an odorless exhaust gas. Reference numeral 14 designates a hood for the outlet of the burned and odorless exhaust gas. A chimney 15 is extended upwardly from the hood 14. Reference numeral 16 designates a blower to send air to the burner 13. A pipe line 17 is a conduit pipe extended from the fuel tank 18. Reference numeral 19 designates a discharge chute provided at the outlet end of the drying kiln.

The apparatus used in the present invention is further provided with an exhaust collector means adapted to collect a stinking exhaust gas from the reactor 1 via a pipe line 20a and/or the drying kiln 7 via a pipe line 20b and transport it to the furnace 11 by a blower 21. Reference numeral 20 generally designates the pipe line of the exhaust collector means.

Now, the operation of the apparatus will be described in connection with a preferred embodiment of the method of the present invention.

A water containing organic waste is introduced into the reactor 1 through the inlet 2. The water containing waste to be treated by the method of the present invention contains from 50% to 99.8% by weight of water. Various organic wastes can be treated by the present invention, such as human excrements, animal excrements, bird droppings, organic sludges comprising dead microorganisms, fish processing wastes or fruit processing wastes. Where the physical size of the material to be treated is too large or not uniform, the reactor 1 should be chosen so that it is capable of smashing the material to a size suitable for the treatment.

Then, from 5% to 40%, based on the weight of the waste to be treated, of calcium oxide or magnesium oxide is introduced into the reactor 1, whereby an exothermic reaction as shown below occurs between calcium oxide and water contained in the waste.

$$CaO + H_2O \rightarrow Ca(OH)_2 + 15.2 \text{ K. cal.}$$

It should be noted that about 30% of water in the waste, based on the weight of calcium oxide, is consumed by the reaction to form a solid calcium hydroxide. A further amount of water is removed by evaporation. A further advantage of this preliminary step is that by the exothermic reaction and decomposition of water, the organic sludge is partly gelated and becomes to be easily handled and suitable for the subsequent treatment. The mixture thus heated by the exothermic reaction to a temperature from about 80° C. to about 90° C. is discharged from the outlet 4 on to the conveyor 5 and thereby transferred to the drying kiln 7 for further drying and granulation. During the transportation by the screw conveyor 5, the mixture is further mixed by the screw 6 and thus the exothermic reaction continues to occur. It is advantageous that the mixture is transferred to the drying kiln while it is still hot thus saving fuel consumption of the subsequent drying operation.

The mixture introduced into the drying kiln 7 is further heated at a temperature between about 100° C. to about 300° C., preferably about 200° C., while agitated by a stirrer means such as stirring vanes, and it is thereby processed into granules of a diameter from about 2 mm to about 5 mm, and finally discharged through the chute 19.

The vapours produced during the processing by the evaporation of water from the waste are accompanied by an offensive filthy odor. They are collected as a stinking exhaust gas by the exhaust collector means and transferred via the exhaust pipe 20 to the heating chamber 12 by the blower 21. The stinking exhaust gas from the reactor 1 is collected through the exhaust pipe 20a and the stinking exhaust gas from the drying kiln 7 is collected through the exhaust pipe 20b.

The conveyor 5 used in the preferred embodiment of this invention is a closed type screw conveyor. If an open type conveyor is used, it is necessary to provide an appropriate exhaust gas collecting means.

An example of the actual processing will now be described.

In the reactor, 100 kg. of pig's excrement containing 88% by weight of water was mixed with 10 kg. of calcium oxide for 3 minutes. The temperature of the mixture in the reactor was 85° C. Then, the mixture was transferred to the drying kiln and thereby processed at a temperature of about 200° C. for 15 minutes. 45 kg. of granules having a diameter of 2 mm to 5 mm was obtained. The water content of the granules was 25% by weight.

The following table shows further examples of the treatment of various organic wastes according to the present invention.

| A | B | C | D | E | F | G | H | I |
|---|---|---|---|---|---|---|---|---|
| Cow's excrements | 50 | 85.0 | 0 | — | — | — | 160 | 5.0 |
| | 40 | 86.3 | 1.6 | — | — | — | 160 | 5.0 |
| | 30 | 84.1 | 26.1 | 10 | — | — | 160 | 5.0 |
| | 20 | 86.4 | 62.6 | 48.6 | — | — | 160 | 7.38 |
| | 15 | 86.6 | 69.1 | 42.2 | — | — | 160 | 7.81 |
| | 10 | 85.4 | 74.5 | 60.1 | — | — | 160 | 7.81 |
| | 10 | 71.2 | 59.3 | 40.9 | 36.9 | 35.3 | 160 | 7.51 |
| | 5 | 79.5 | 74.0 | 56.5 | 39.8 | 37.8 | 160 | 12.20 |
| Pig's excrements | 20 | 71.3 | 42.6 | 26.1 | 20.9 | 15.2 | 160 | — |
| | 20 | 73.5 | 46.0 | 9.6 | 7.0 | 4.7 | 160 | — |
| | 15 | 72.5 | 54.1 | 44.5 | 32.0 | 25.1 | 160 | 7.40 |
| | 10 | 80.0 | 68.4 | 59.8 | 43.8 | 33.9 | 160 | 7.51 |
| | 10 | 65.5 | 53.3 | 43.5 | 30.1 | 28.9 | 160 | 7.40 |
| | 5 | 68.7 | 63.0 | 52.5 | — | — | 160 | 7.50 |
| Human | 10 | 79.1 | 63.2 | 56.3 | 39.6 | 35.8 | 213 | 7.51 |

-continued

| A | B | C | D | E | F | G | H | I |
|---|---|---|---|---|---|---|---|---|
| excrements | 5 | 75.7 | 67.9 | 58.7 | 48.1 | 41.8 | 160 | 7.51 |

Column A: Wastes treated.
Column B: CaO (% by weight)
Column C: Water contents of the wastes (% by weight)
Column D: Water contents of the mixture (% by weight)
Column E: Water contents of products after 3 minutes of the processing in the drying kiln (% by weight)
Column F: Water contents of products after 24 hours of the processing in the drying kiln (% by weight)
Column G: Water contents of products after 48 hours of the processing in the drying kiln (% by weight)
Column H: Amounts of the wastes treated. (kgs.)
Column I: Fuel consumption (liters of kerosene used)

The invention will now be described in connection with the treatment of a water containing inorganic waste such as sludges from industrial and sewage disposal plants.

Inorganic sludges to be treated by the method of this invention contains from 50% to 99.8% by weight of water. Such inorganic sludges in an amount of 100 parts by weight is mixed in the reactor 1 with from 5 to 40 parts by weight of calcium oxide and then the mixture is subjected to the further drying and granulation operation as descibed above. The amount of calcium oxide is so adjusted, depending upon the water contents of the sludge, that the final cement type product will have desired properties. Noxious elements such as sulfate ion in the sludges are reacted with calcium oxide to form water insoluble salts, thus becoming innoxious. Certain other types of noxious substances may be trapped in a cement type final products in such a form that they no more cause pollution problems.

The dried solid products discharged from the drying kiln are brittle and not yet suitable for use as cement products, or cement additives. Therefore, the solid products are heated at a temperature from about 800° C. to about 1,450° C., preferably from about 900° C. to about 1,400° C., whereby cement type products are obtained.

The amount of calcium oxide to be used in the method of this application is from 5% to 40% based on the weight of the waste to be treated. An amount less than 5% does not provide a sufficient heat for the preliminary drying in the reactor, nor does it sufficiently work to solidify the inorganic sludges. An amount more than 40% is excessive and adversely affects the granulation of the mixture.

Next, an example of the method of treating a water containing inorganic waste will be described.

100 kg. of a kaolin sludge containing 80% by weight of water was mixed with 20 kg. of calcium oxide and the mixture was processed as described heretofore. A solid product containing 47% by weight of water was obtained. The product was heated at a temperature of 1,200° C., and then pulverized to a particle size of 300 mesh, whereby a cement type product was obtained.

The following table shows further examples and their results with respect to the treatment of water containing inorganic wastes.

| A | B | C | D | E | F | G | H | I |
|---|---|---|---|---|---|---|---|---|
| Sludges | 50 | 80 | 42.7 | 30.0 | — | — | 160 | 7.0 |
| from a | 40 | 80 | 48.0 | 42.8 | — | — | 160 | 8.2 |
| sewage | 30 | 80 | 54.2 | 51.0 | — | — | 160 | 8.9 |
| disposal | 20 | 80 | 61.3 | 61.1 | 57.0 | 50 | 160 | 9.3 |
| plant | 10 | 80 | 69.8 | 69.6 | 65.0 | 59 | 160 | 9.5 |
| | 5 | 80 | 74.7 | 74.5 | 70.0 | 63 | 160 | 10 |

Column A: Wastes treated.
Column B: CaO (% by weight)
Column C: Water contents of the wastes (% by weight)
Column D: Water contents of the mixture (% by weight)
Column E: Water contents of products after 3 minutes of the processing in the drying kiln (% by weight)
Column F: Water contents of products after 24 hours of the processing in the drying kiln (% by weight)
Column G: Water contents of products after 48 hours of the processing in the drying kiln (% by weight)
Column H: Amounts of the wastes treated. (kgs.)
Column I: Fuel consumption (liters of kerosene used)

Having thus described the invention, it is apparent that the invention provides a highly economical method of treating the wastes by the utilization of the exothermic reaction of an alkaline earth metal oxide with water contained in the waste. A further saving of fuel consumption is attained by the effective combination of the reactor and the drying kiln such that a loss of heat during the transportation from the reactor to the drying kiln is minimized. The cost of fuel consumption according to the present invention is approximately one fifth to one half of the corresponding costs with the conventional drying and granulation apparatus.

As mentioned above, noxious elements such as sulfate ion or chrome in the sludges and other wastes from chemical or other plants may be converted to innoxious alkaline earth metal salts or otherwise fixed in the final products according to the invention. The final products can therefore be disposed or used without creating pollution problems.

When treated by the method of the present invention, inorganic oxides contained in inorganic sludges react with calcium oxide to form substances such as $x(CaO)_m \cdot (Fe_2O_3)_n \cdot yH_2O$, $x(CaO)_m(Al_3O_3)_n \cdot yH_2O$ or $x(CaO)_m \cdot (SiO_2)_n \cdot yH_2O$, which resemble the major constituents of iron cement, alumina cement or portland cement, respectively. The products thus obtained have properties very much like those of the respective cements. They may be used as cement materials, cement additives or for construction materials.

When treated by the method of this invention, organic constituents contained in an organic waste are not decomposed during the processing and remain in the final granule products. Therefore, when the granule products are used as fertilizers, the organic constituents serve effectively in combination with calcium constituents for that purpose.

The products obtained by the present invention are substantially odorless and therefore can be handled without filthy odor problems or may be used or disposed without causing pollution.

Worms, bacteria and their eggs in the wastes are completely killed or destroyed during the heat processing and therefore the obtained products are sterilized and clean. As the products are in a form of odorless dried granules, they do not attract flies and no breeding of worms or bacteria is likely to occur.

What is claimed is:

1. A method of treating water containing organic waste comprising the steps of: mixing 100 parts by weight of the organic waste containing 50% to 99.8% by weight of water with from 5 to 40 parts by weight of calcium oxide to produce an exothermic reaction mixture of the calcium oxide and the water containing the waste; heating the reaction mixture using the heat from the exothermic reaction mixture to obtain a preliminary dried mixture; transferring the preliminarily dried mixture to a drying kiln; further drying the preliminarily dried mixture and granulating it in the drying kiln by continuously agitating and heating the preliminarily dried mixture to a temperature of between 100° C. and 300° C. to yield a granulated product, collecting stinking exhaust gases produced by said mixing of the waste with calcium oxide; channeling the exhaust gases to a furnace; and burning the exhaust gases in the furnace to produce substantially odorless gases.

* * * * *